US012638761B2

(12) United States Patent
Yoshikawa et al.

(10) Patent No.: US 12,638,761 B2
(45) Date of Patent: May 26, 2026

(54) LIGHT SOURCE DEVICE AND PROJECTION DISPLAY APPARATUS

(71) Applicant: Panasonic Intellectual Property Management Co., Ltd., Osaka (JP)

(72) Inventors: Takamasa Yoshikawa, Osaka (JP); Takao Yamashita, Osaka (JP); Nao Morishita, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 398 days.

(21) Appl. No.: 18/204,544

(22) Filed: Jun. 1, 2023

(65) Prior Publication Data

US 2023/0418142 A1     Dec. 28, 2023

(30) Foreign Application Priority Data

Jun. 23, 2022     (JP) ................................. 2022-101353

(51) Int. Cl.
*G03B 21/20*          (2006.01)
*G03B 21/00*          (2006.01)
(52) U.S. Cl.
CPC ......... *G03B 21/204* (2013.01); *G03B 21/006* (2013.01); *G03B 21/008* (2013.01); *G03B 21/2073* (2013.01)
(58) Field of Classification Search
CPC .. G03B 21/005; G03B 21/006; G03B 21/008; G03B 21/28; G03B 21/204;
(Continued)

(56) References Cited

U.S. PATENT DOCUMENTS 10,571,790 B2 *  2/2020  Kita .......................... F21V 7/05
2015/0222864 A1  8/2015  Inoko
(Continued)

FOREIGN PATENT DOCUMENTS

JP          2012-123179          6/2012
JP          2014-211480          11/2014
(Continued)

OTHER PUBLICATIONS

Japanese Office Action issued Feb. 10, 2026 in corresponding Japanese Patent Application No. 2022-101353, with English machine translation (12 pages).

*Primary Examiner* — Sultan Chowdhury
(74) *Attorney, Agent, or Firm* — Wenderoth, Lind & Ponack, L.L.P.

(57)          ABSTRACT
A light source device includes: a light source unit emitting first light in a first polarization direction and second light in a second polarization direction; a polarization separation element receiving the first light and the second light; a phosphor receiving the first light transmitted through the polarization separation element; and a phase conversion element receiving the second light reflected by the polarization separation element. The polarization separation element reflects visible light having a longer wavelength than a polarization transmission wavelength region. The phosphor converts the received first light into third light having a longer wavelength than the polarization transmission wavelength region. The phase conversion element phase-converts the received second light into fourth light in the first polarization direction. The polarization separation element combines illumination light with the third light reflected by the polarization separation element and the fourth light transmitted through the polarization separation element.

15 Claims, 5 Drawing Sheets

(58) Field of Classification Search
CPC ............ G03B 21/2013; G03B 21/2033; G03B
21/2053; G03B 21/2066; G03B 21/2073;
H04N 9/315; H04N 9/3102; H04N
9/3105; H04N 9/3108; H04N 9/3114;
H04N 9/3117; H04N 9/3126; H04N
9/3141; H04N 9/3152; H04N 9/3161;
H04N 9/3164; H04N 9/3167
See application file for complete search history.

(56) References Cited

U.S. PATENT DOCUMENTS

| | | | | |
|---|---|---|---|---|
| 2018/0017856 A1* | 1/2018 | Tanaka | ................. | G02B 5/3083 |
| 2020/0301260 A1* | 9/2020 | Takano | ................ | G03B 21/208 |
| 2021/0041777 A1* | 2/2021 | Iwashita | ................ | G03B 21/16 |
| 2021/0191243 A1 | 6/2021 | Tanaka et al. | | |
| 2021/0203895 A1* | 7/2021 | Okuno | ................. | H04N 9/3158 |
| 2022/0026788 A1* | 1/2022 | Akiyama | ........... | G03B 21/2073 |
| 2023/0418142 A1* | 12/2023 | Yoshikawa | ........ | G03B 21/2073 |

FOREIGN PATENT DOCUMENTS

| | | |
|---|---|---|
| JP | 2015-163947 | 9/2015 |
| JP | 2016-184114 | 10/2016 |
| JP | 2018-13764 | 1/2018 |
| JP | 2019-061082 | 4/2019 |
| JP | 2019-200232 | 11/2019 |
| JP | 2020-20962 | 2/2020 |
| WO | 2020/054397 | 3/2020 |

* cited by examiner

LIGHT SOURCE DEVICE AND PROJECTION DISPLAY APPARATUS

BACKGROUND

1. Technical Field

The present disclosure relates to a light source device used as alight source of a projection display apparatus, and a projection display apparatus provided with such a light source device.

2. Description of the Related Art

As a light source of a projection display apparatus using a mirror deflection type digital micromirror device (DMD) or a light valve of a liquid crystal panel, many light source devices each using a solid-state light source of a semiconductor laser or a light emitting diode, which has a long life, have been disclosed. For example, PTL 1 discloses a light source device that generates white illumination light by using a dichroic mirror as a polarization separation element using polarization characteristics of light emitted from a solid-state light source. In addition, PTL 2 discloses a light source device that uses a wavelength selective type polarization beam splitter and a dichroic mirror in combination to realize separation of light of a light source and color synthesis of emitted illumination light, and generates white illumination light.

FIG. 6 is a graph illustrating a relationship between spectral characteristics of the dichroic mirror and an emission spectrum of a light source in PTL 1. As illustrated in FIG. 6, in the dichroic mirror of the light source device disclosed in PTL 1, a wavelength at which transmittance becomes 50% with respect to P-polarized light is about 442 nm, and a wavelength at which transmittance becomes 50% with respect to S-polarized light is about 465 nm. In addition, the dichroic mirror is configured to have a characteristic of transmitting light regardless of the polarization direction with respect to light on a longer wavelength side than 470 nm.

PTL 1: Unexamined Japanese Patent Publication No. 2018-013764
PTL 2: Unexamined Japanese Patent Publication No. 2020-020962

SUMMARY

However, in general, blue laser beam LB of the laser light source of the projection display apparatus has an emission spectrum of 447 nm to 462 nm. As illustrated in the drawing, the dichroic mirror of PTL 1 has region Rps that partially reflects P-polarized light near 447 nm on the short wavelength side of the emission spectrum of the light source. In addition, in the vicinity of 462 nm on the long wavelength side of the emission spectrum of the light source, there is region Ts1 partially transmitting the S-polarized light. As a result, a part of the P-polarized light or the S-polarized light of the blue light to be emitted as the color component light of the illumination light cannot be used by being reflected or transmitted by the dichroic mirror, and the light utilization factor of the light source decreases. In addition. FIG. 6 illustrates spectral characteristics of the dichroic mirror when the light of the light source is incident as a parallel light beam. For example, in a case where light of a light source is incident on the dichroic mirror by a light beam that is condensed or diverged, a spectral characteristic of the dichroic mirror is shifted to a short wavelength side or a long wavelength side with respect to an incident light beam having an inclination angle with respect to an optical axis. Therefore, the light utilization factor of the light source may further decrease.

In addition, in the light source device of PTL 2, the light utilization factor of the light source may decrease due to propagation loss of light caused by an increase in the number of components of the optical system in the configuration in which the wavelength selective type polarization beam splitter and the dichroic mirror are used in combination.

In a projection display apparatus, a light source device capable of outputting brighter illumination light is required. Therefore, from the viewpoint of improving the light utilization efficiency of the light source, there is still room for improvement in the conventional light source device.

Therefore, an object of the present disclosure is to provide a light source device capable of improving light utilization efficiency of a light source and outputting brighter illumination light.

In order to achieve the above object, a light source device according to the present disclosure includes: a light source unit that emits linearly polarized light in a first wavelength range, the linearly polarized light including first light that is light in a first polarization direction and second light that is light in a second polarization direction orthogonal to the first polarization direction; a polarization separation element that receives the first light and the second light emitted from the light source unit; a phosphor that receives the first light transmitted through the polarization separation element; and a phase conversion element that receives the second light reflected by the polarization separation element. The polarization separation element has a polarization transmission wavelength region including the first wavelength range, transmits the light in the first polarization direction and reflects the light in the second polarization direction in the polarization transmission wavelength region, and reflects light regardless of a polarization direction in a visible light range on a longer wavelength side than the polarization transmission wavelength region. The phosphor converts the received first light into third light in a wavelength range on a longer wavelength side than the polarization transmission wavelength region and emits the third light to the polarization separation element. The phase conversion element phase-converts the received second light into fourth light that is the light in the first polarization direction in the first wavelength range and emits the fourth light to the polarization separation element. The polarization separation element combines illumination light with the third light reflected by the polarization separation element and the fourth light transmitted through the polarization separation element.

According to the light source device of one aspect of the present disclosure, it is possible to improve light utilization efficiency of the light source and output brighter illumination light.

DETAILED DESCRIPTIONS

Figure 1:
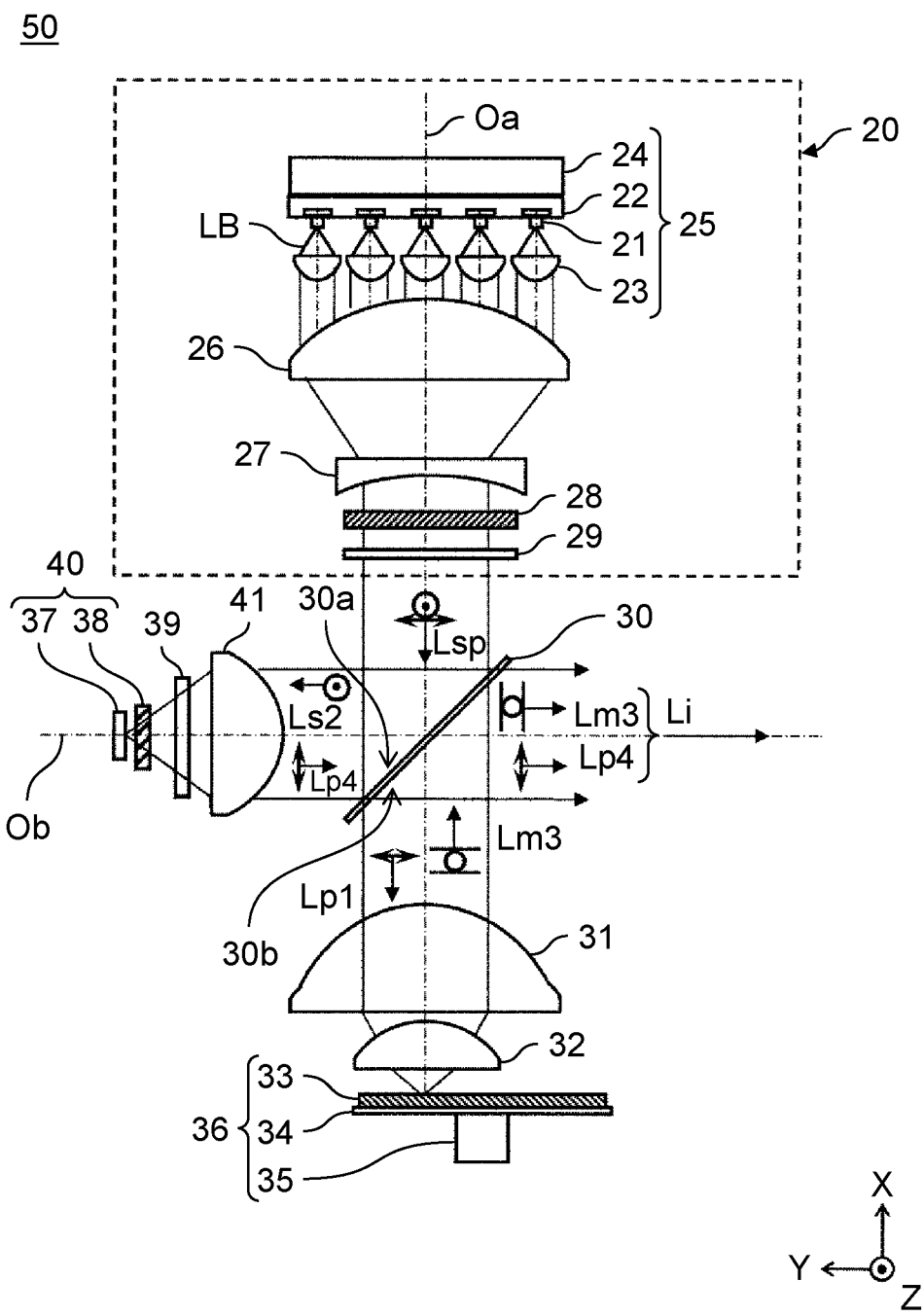
FIG. 1 is a schematic view illustrating a configuration of a light source device according to a first exemplary embodiment of the present disclosure.

According to a first aspect of the present disclosure, there is provided a light source device including: a light source unit that emits linearly polarized light in a first wavelength range, the linearly polarized light including first light that is light in a first polarization direction and second light that is light in a second polarization direction orthogonal to the first polarization direction; a polarization separation element that receives the first light and the second light emitted from the light source unit; a phosphor that receives the first light transmitted through the polarization separation element; and a phase conversion element that receives the second light reflected by the polarization separation element. The polarization separation element has a polarization transmission wavelength region including the first wavelength range, transmits the light in the first polarization direction and reflects the light in the second polarization direction in the polarization transmission wavelength region, and reflects light regardless of a polarization direction in a visible light range on a longer wavelength side than the polarization transmission wavelength region. The phosphor converts the received first light into third light in a wavelength range on a longer wavelength side than the polarization transmission wavelength region and emits the third light to the polarization separation element. The phase conversion element phase-converts the received second light into fourth light that is the light in the first polarization direction in the first wavelength range and emits the fourth light to the polarization separation element. The polarization separation element combines illumination light with the third light reflected by the polarization separation element and the fourth light transmitted through the polarization separation element.

According to this aspect, it is possible to improve light utilization efficiency of the light source and output brighter illumination light.

According to a second aspect of the present disclosure, there is provided the light source device according to the first aspect, the light source unit further includes a first retardation plate, and the first retardation plate controls a ratio between the first light and the second light emitted from the light source unit.

A third aspect of the present disclosure provides the light source device according to the second aspect, in which the first retardation plate is a ½ wavelength plate or a ¼ wavelength plate.

According to a fourth aspect of the present disclosure, there is provided the light source device according to the second or third aspect, in which the first retardation plate is a thin coating retardation plate using birefringence by oblique vapor deposition or a microstructural retardation plate using birefringence by a microstructure.

According to a fifth aspect of the present disclosure, there is provided the light source device according to any one of the first to fourth aspects, in which the phase conversion element includes a second retardation plate and a reflector disposed along a light propagation path of the second light reflected by the polarization separation element, the second retardation plate is a ¼ wavelength plate, receives the second light, converts linearly polarized light into circularly polarized light, and transmits the circularly polarized light, and the reflector receives light transmitted through the second retardation plate, inverts a phase of the light, and reflects the light to the second retardation plate.

According to a sixth aspect of the present disclosure, there is provided the light source device according to the fifth aspect, in which the second retardation plate is a thin coating retardation plate using birefringence by oblique vapor deposition or a microstructural retardation plate using birefringence by a microstructure.

According to a seventh aspect of the present disclosure, there is provided the light source device according to any one of the first to sixth aspects, in which the polarization separation element has, in the polarization transmission wavelength region, a transmittance of 96% or more with respect to the first light, and a reflectance of 98% or more with respect to the second light.

According to an eighth aspect of the present disclosure, there is provided the light source device according to any one of the first to seventh aspects, in which the polarization separation element reflects light regardless of a polarization direction in a visible light range other than the polarization transmission wavelength region.

According to a ninth aspect of the present disclosure, there is provided the light source device according to any one of the first to eighth aspects, in which a width of the polarization transmission wavelength region ranges from 25 nm to 50 nm, inclusive.

According to a tenth aspect of the present disclosure, there is provided the light source device according to any one of the first to ninth aspects, in which the polarization separation element is a flat plate-shaped polarization beam splitter.

According to an eleventh aspect of the present disclosure, there is provided the light source device according to any one of the first to tenth aspects, in which the first light and the second light are blue laser beams.

According to a twelfth aspect of the present disclosure, there is provided the light source device according to any one of the first to eleventh aspects, in which the first light is P-polarized light.

According to a thirteenth aspect of the present disclosure, there is provided a projection display apparatus including: the light source device according to any one of the first to twelfth aspects; a light modulation element that spatially modulates incident light according to an image signal; an illumination optical system that guides illumination light emitted from the light source device to the light modulation element; and a projection optical system that enlarges and projects light emitted from the light modulation element to display an image.

According to a fourteenth aspect of the present disclosure, there is provided the projection display apparatus according to the thirteenth aspect, in which the light modulation element is a liquid crystal panel.

According to a fifteenth aspect of the present disclosure, there is provided the projection display apparatus according to the thirteenth aspect, in which the light modulation element is a digital micromirror device.

Note that by appropriately combining discretionary exemplary embodiments among the various exemplary embodiments described above, the effects of the respective exemplary embodiments can be achieved.

Hereinafter, exemplary embodiments will be described in detail with appropriate reference to the drawings. However, unnecessarily detailed description may not be described. For example, the detailed description of already well-known matters and the overlap description of substantially the same configurations may not be described. This is to avoid an unnecessarily redundant description below and to facilitate understanding of a person skilled in the art.

A light source device according to a first exemplary embodiment of the present disclosure and a projection display apparatus including the light source device will be described with reference to FIGS. 1 to 5. The accompanying drawings and the following description are provided for those skilled in the art to fully understand the present disclosure, and are not intended to limit the subject matter described in the claims. In each drawing, elements are exaggerated in order to facilitate explanation. In the drawings, substantially the same members are denoted by the same reference marks.

First Exemplary Embodiment (Light Source Device)

Figure 2:
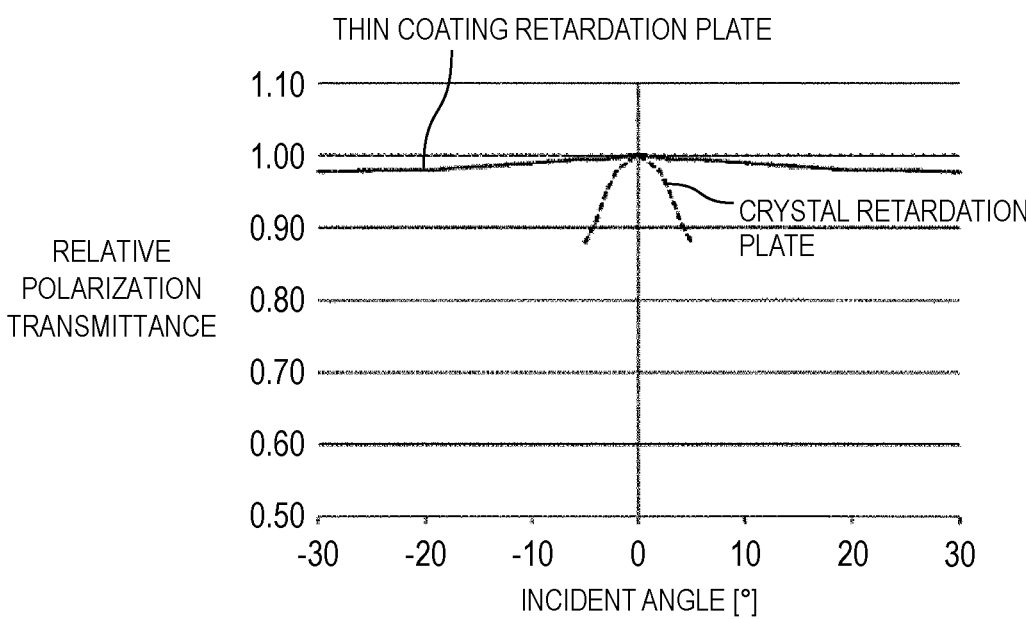
FIG. 2 is a graph illustrating an angle dependence of polarization transmittance between a thin coating retardation plate and a crystal retardation plate.
Figure 3:
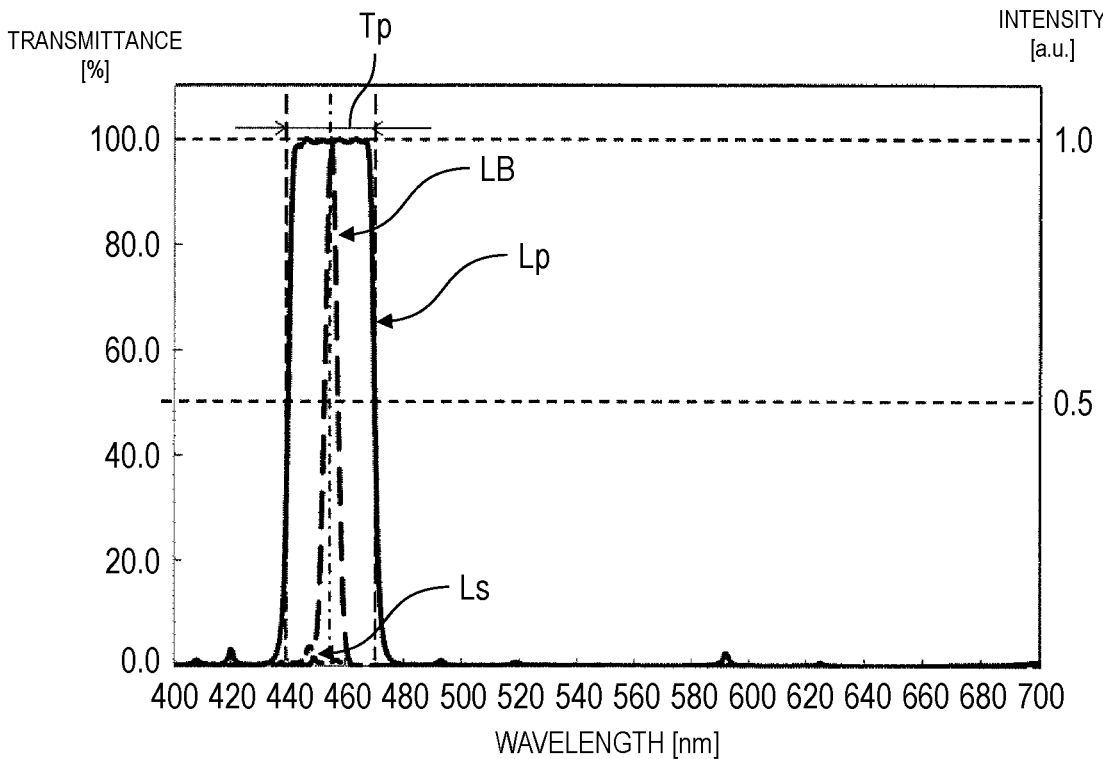
FIG. 3 is an example of a graph illustrating a relationship between spectral characteristics of the polarization separation element of FIG. 1 and an emission spectrum of a light source.

A light source device according to a first exemplary embodiment of the present disclosure will be described with reference to FIGS. 1 to 3. FIG. 1 is a schematic view illustrating a configuration of light source device 50 according to the first exemplary embodiment of the present disclosure. FIG. 2 is a graph illustrating an angle dependence of a polarization transmittance between a thin coating retardation plate and a crystal retardation plate. FIG. 3 is an example of a graph illustrating the relationship between the spectral characteristic of polarization separation element 30 of FIG. 1 and the emission spectrum of the light source.

As illustrated in FIG. 1, light source device 50 according to the present exemplary embodiment includes light source unit 20, polarization separation element 30, condenser lenses 31 and 32 as a first light condensing element, phosphor wheel 36, condenser lens 41 as a second light condensing element, second diffusion plate 39, and phase conversion element 40. For clarity, each light beam is shown in FIG. 1 only in the principal ray.

<Light Source Unit>

In the present exemplary embodiment, light source unit 20 of light source device 50 includes solid-state light source 25, afocal lenses 26, 27, first retardation plate 28, and first diffusion plate 29. solid-state light source 25 includes, for example, a plurality of semiconductor lasers (LD) or light emitting diodes (LED). In the present exemplary embodiment, a plurality of semiconductor laser elements 21 that emit blue light can be used. In solid-state light source 25 according to the present exemplary embodiment, for example, 84 (28×3) semiconductor laser elements 21 disposed in a square shape and respective collimating lenses 23 are two-dimensionally disposed at regular intervals on heat radiation plate 22. Further, heat sink 24 for cooling the semiconductor laser element is provided behind the heat radiation plate 22. Light emitted from the plurality of semiconductor laser elements 21 is blue laser beam LB having a wavelength of 447 nm to 462 nm, and is used as image light and also used as excitation light for exciting phosphor layer 33 of phosphor wheel 36.

Blue laser beam LB emitted from each semiconductor laser element 21 is emitted in the −X direction in the drawing, collimated by collimating lens 23, focused by afocal lenses 26, 27, transmitted through first retardation plate 28 and first diffusion plate 29, and propagated along optical axis Oa. In the present exemplary embodiment, solid-state light source 25 can be configured to emit linearly polarized light. For example, each semiconductor laser element 21 can be arranged such that blue laser beam LB emitted from semiconductor laser element 21 is P-polarized light with respect to light receiving surface 30a of polarization separation element 30.

In the present specification, the linearly polarized light oscillating in the Z direction in the drawing is defined as S-polarized light, and is denoted by reference sign "Ls" in the present specification. The linearly polarized light oscillating on the X-Y plane in the drawing is defined as P-polarized light, and is denoted by reference sign "Lp" in the present specification. The polarized light including both the P-polarized light and the S-polarized light is polarized light in a state where the P-polarized component and the S-polarized component are combined at a predetermined ratio. That is, polarized light including both P-polarized light and S-polarized light includes linearly polarized light, circularly polarized light, and elliptically polarized light including P-polarized light and S-polarized light, and is denoted by a reference sign "Lsp" in the present specification. In addition, the non-polarized light is light in a state in which linearly polarized light, circularly polarized light, elliptically polarized light, or the like is mixed, that is, light in which the direction of an electric field vector is random, and is denoted by a reference sign "Lm" in the present specification.

Blue laser beam LB emitted from the plurality of semiconductor laser elements 21 is condensed and converted into parallel light fluxes by corresponding collimating lenses 23, further reduced in diameter by afocal lenses 26, 27, and incident on first retardation plate 28.

<First Retardation Plate>

In the present exemplary embodiment, light source unit 20 includes first retardation plate 28, and first retardation plate 28 can control a ratio between the P-polarized light (an example of a first polarization direction) and the S-polarized light (an example of a second polarization direction) included in the blue laser beam from solid-state light source 25, first retardation plate 28 is configured using, for example, a retardation plate having a retardation of ½ wavelength near the center emission wavelength of semiconductor laser element 21, and an adjustment mechanism can be provided in the rotation direction to adjust the arrangement angle of the optical axis. In the present exemplary embodiment, for example, when the P-polarization direction of the light beam of incident blue laser beam LB is set to 0 degrees with respect to the Y axis with optical axis Oa as the rotation axis, the optical axis of first retardation plate 28 can be arranged at 13 degrees with respect to the Y axis with optical axis Oa as the rotation axis. As a result, the polarization direction of the P-polarized blue laser beam LB is converted to 26 degrees, and the transmitted blue polarized light Lsp can be controlled to be emitted from light source unit 20 such that the light intensity of P-polarized blue component light Lp1 is about 81% and the light intensity of S-polarized blue component light Ls2 is about 19%.

Polarization separation element 30 described in detail later separates light according to the polarization direction of the incident light. Therefore, by controlling the ratio between P-polarized blue component light Lp1 and S-polarized blue component light Ls2 included in blue polarized light Lsp emitted from light source unit 20 and incident on polarization separation element 30, the light separation ratio by polarization separation element 30 can be accurately controlled. By adjusting the light separation ratio by polarization separation element 30 to a predetermined value, it is possible to combine white illumination light having a good white balance.

In the present exemplary embodiment, as first retardation plate 28, a thin coating retardation plate (see Unexamined Japanese Patent Publication No. 2012-242449) using birefringence by oblique vapor deposition of a dielectric material can be used. The thin coating retardation plate is made of an inorganic material, and is excellent in durability and reliability similar to inorganic optical crystals such as quartz. In addition, since the thin coating retardation plate is laminated and formed with a coating thickness sufficiently thinner than the wavelength of light, the change in the retardation with respect to the incident angle of light is much smaller than that of the retardation plate of an inorganic optical crystal such as crystal. This characteristic will be described with reference to FIG. 2.

FIG. 2 illustrates an example of the angle dependence of the polarization transmittance of the thin coating retardation plate (solid line) and the crystal retardation plate (broken line). The transmittance of one linearly polarized component after linearly polarized light is incident on the retardation plate and converted into circularly polarized light is defined as a polarization transmittance, and the polarization transmittance with respect to the incident angle is shown. The polarization transmittance when the incident angle is 0 degrees is normalized as 1.0. The polarization transmittance of the thin coating retardation plate decreases by 6% at an incident angle of ±30 degrees, whereas the polarization transmittance of the crystal retardation plate decreases by 12% at an incident angle of ±5 degrees. Since the thin coating retardation plate is a retardation plate having very small dependence on the incident angle, even if the thin coating retardation plate is disposed at a position where the condensed light or the diffused light is incident, the incident linearly polarized light can be converted into circularly polarized light with high efficiency. By utilizing this characteristic, in the present exemplary embodiment, for example, first retardation plate 28 can be disposed at the incident position of the converging beam of blue laser beam LB (not illustrated). By disposing first retardation plate 28 at the incident position of the converging beam, the size of the retardation plate can be reduced, and the cost of the optical system can be reduced.

First retardation plate 28 has been described using a thin coating retardation plate using birefringence by oblique vapor deposition of a dielectric material, but a microstructural retardation plate using birefringence by a fine periodic structure equal to or less than a wavelength of light may be used. In the present exemplary embodiment, a ½ wavelength plate is used as first retardation plate 28, but the present disclosure is not limited thereto. For example, by using a ¼ wavelength plate as first retardation plate 28 and adjusting the arrangement angle of the optical axis of first retardation plate 28. P-polarized blue component light Lp1 and S-polarized blue component light Ls2 in blue polarized light Lsp emitted from light source unit 20 can be controlled to have a predetermined ratio. For example, by arranging the optical axis of the ¼ wavelength plate as first retardation plate 28 at 19 degrees with respect to the Y axis with optical axis Oa as a rotation axis, blue polarized light Lsp after transmission becomes elliptically polarized light, and P-polarized blue component light Lp1 and S-polarized blue component light Ls2 are emitted from light source unit 20 so that the light intensities thereof become 81% and 19%, respectively.

Further, in the present exemplary embodiment, light source unit 20 is configured to include first retardation plate 28, but the present disclosure is not limited thereto. For example, light source unit 20 can be configured by omitting first retardation plate 28. In this case, each semiconductor laser element 21 of solid-state light source 25 can be rotated, and disposed so as to emit the P-polarized light with optical axis Oa as the rotation axis and an inclination angle of about 26° with respect to the Y axis. As a result, the light intensity of P-polarized blue component light Lp1 and the light intensity of S-polarized blue component light Ls2 in blue polarized light Lsp emitted from light source unit 20 can be controlled to be about 81% and about 19%, respectively.

The light transmitted through first retardation plate 28 reaches first diffusion plate 29. First diffusion plate 29 is made of glass and diffuses light with fine irregularities. A diffusion angle, which is a half-value angular width at which the intensity is 50% of maximum light intensity of the diffused light, is as small as approximately 3 degrees, and polarization characteristics are maintained.

Blue polarized light Lsp emitted from light source unit 20 is propagated in the −X direction in the drawing and is incident on polarization separation element 30 along optical axis Oa Hereinafter, polarization separation element 30 of light source device 50 of the present exemplary embodiment will be described with reference to FIG. 3.

<Polarization Separation Element>

The polarization separation element according to the present disclosure can separate light according to a polarization direction of incident light by transmitting P-polarized light and reflecting S-polarized light with respect to the incident light in a predetermined wavelength range. In light source device 50 according to the exemplary embodiment of the present disclosure, polarization separation element 30 can separate the light from light source unit 20 and combine the respective color component lights to generate the illumination light.

Specifically, as illustrated in FIG. 1, polarization separation element 30 transmits P-polarized blue component light Lp1 and reflects S-polarized blue component light Ls2 among blue polarized light Lsp incident from the X direction in the drawing, and separates the blue laser beam from the light source unit in the X direction and the Y direction in the drawing. Further, in the present exemplary embodiment, polarization separation element 30 can combine white illumination light Li with fluorescence light Lm3 and blue component light Lp4 by reflecting non-polarized fluorescence light Lm3 arriving from the X direction in the drawing and transmitting P-polarized blue component light Lp4 arriving from the Y direction in the drawing. Combined white illumination light Li is emitted from light source device 50 along optical axis Ob in the −Y direction in the drawing. In the present specification, P-polarized blue component light Lp1, S-polarized blue component light Ls2, non-polarized fluorescence light Lm3, and P-polarized blue component light Lp4 are also referred to as first light, second light, third light, and fourth light, respectively. Polarization separation element 30 can include, for example, a polarization beam splitter. In the present exemplary embodiment, polarization separation element 30 includes a flat plate-shaped polarization beam splitter, and light receiving surface 30*a* and emission surface 30*b* are arranged to be inclined by 45° with respect to optical axis Oa. Hereinafter, spectral characteristics of polarization separation element 30 will be described with reference to FIG. 3.

FIG. 3 illustrates an example of a graph for explaining the relationship between the spectral characteristic of polarization separation element 30 and the emission spectrum of light source unit 20. In FIG. 3, the horizontal axis represents the wavelength, the first vertical axis on the left side represents the transmittance of polarization separation element 30, and the second vertical axis on the right side is a two-axis graph representing the light intensity of the emission spectrum of light source unit 20. In addition, corresponding to the first vertical axis, the transmittance of S-polarized component Ls of the polarized light incident on polarization separation element 30 is indicated by a broken line, and the transmittance of P-polarized component Lp is indicated by a solid line. Corresponding to the second vertical axis, the light intensity of the emission spectrum of light source unit 20 is indicated by a broken line, and the maximum light intensity is set to 1.0 [a. u.]. As described above, in the present exemplary embodiment, blue laser beam LB emitted from semiconductor laser element 21 of light source unit 20 has the wavelength range of 447 nm to 462 nm (an example of the first wavelength range), and exhibits the emission spectrum having the sharp peak near the center wavelength of 450 nm.

As illustrated in FIG. 3, polarization separation element 30 has polarization transmission wavelength region Tp between a wavelength of 440 nm on the short wavelength side at which the light transmittance becomes 50% and a wavelength of 470 nm on the long wavelength side with respect to P-polarized component Lp. Polarization separation element 30 has high transmittance with respect to P-polarized component Lp and high reflectance with respect to S-polarized component Ls in polarization transmission wavelength region Tp. As a result, polarization separation element 30 can separate the incident blue polarized light Lsp with high efficiency so as to transmit P-polarized blue component light Lp1 and propagate along optical axis Oa. and reflect S-polarized blue component light Ls2 and propagate along optical axis Ob.

As illustrated in FIG. 3, polarization transmission wavelength region Tp of polarization separation element 30 includes the entire wavelength range of the blue laser beam LB from 447 nm to 462 nm. Therefore, polarization separation element 30 can transmit P-polarized blue component light Lp1 with high transmittance, for example, 96% or more, and reflect S-polarized blue component light Ls2 with high reflectance, for example, 98% or more, over the wavelength range of the received blue polarized light Lsp. S-polarized blue component light Ls2 of blue polarized light Lsp reflected by polarization separation element 30 propagates along optical axis Ob, reaches phase conversion element 40, and is then converted into P-polarized light by phase conversion element 40. Converted P-polarized blue component light Lp4 is blue color component light of the illumination light, is propagated to polarization separation element 30 again, and can be transmitted through polarization separation element 30 and emitted with high transmittance in polarization transmission wavelength region Tp.

In addition, in the present exemplary embodiment, as illustrated in FIG. 3, polarization separation element 30 has a characteristic of reflecting light regardless of the polarization direction in the visible light range on the longer wavelength side than polarization transmission wavelength region Tp, that is, in the wavelength range of 480 nm to 700 nm in the drawing. In the present exemplary embodiment, polarization separation element 30 can reflect the light in the wavelength range on the longer wavelength side than polarization transmission wavelength region Tp, for example, with a reflectance of 98% or more regardless of the polarization direction. P-polarized blue component light Lp1 of blue polarized light Lsp transmitted through polarization separation element 30 propagates along optical axis Oa, reaches the phosphor wheel 36, and excites the phosphor of phosphor layer 33, thereby emitting fluorescence in a wavelength range on a longer wavelength side than polarization transmission wavelength region Tp. The non-polarized fluorescence light Lm3 generated by the phosphor includes the green and red color component lights of the illumination light, is propagated to polarization separation element 30 again, is reflected by polarization separation element 30 with a high reflectance on the long wavelength side than polarization transmission wavelength region Tp, and can be emitted.

As described above, light source device 50 of the present disclosure can improve the utilization factor of the blue light to be emitted as the color component light of the illumination light, improve the light utilization efficiency of the light source, and output brighter illumination light by the spectral characteristic of polarization separation element 30 illustrated in FIG. 3.

Further, polarization separation element 30 can have a characteristic of reflecting light regardless of the polarization direction in a visible light range other than polarization transmission wavelength region Tp, for example, a wavelength range of 440 nm or less on the short wavelength side. The laser light source used in the light source device may include a light component having a short wavelength, for example, near 440 nm due to the influence of the temperature of the operating environment or the like. When such a short-wavelength light component is transmitted through polarization separation element 30 and is incident on the phosphor wheel 36, phosphor layer 33 may be damaged. In addition, since light near 440 nm is purple, it is an undesirable light component even in combination of illumination light from the viewpoint of color reproducibility. Therefore, polarization separation element 30 has a characteristic of reflecting light regardless of the polarization direction in the visible light range on the short wavelength side less than or equal to polarization transmission wavelength region Tp, so that a light component having a short wavelength near 440 nm can be excluded from the incident light and the illumination light of the phosphor wheel.

As described above, polarization separation element 30 is configured such that polarization transmission wavelength region Tp includes the wavelength range of the blue laser beam of solid-state light source 25. In addition, desirably, the width (hereinafter, the "width of the polarization transmission wavelength region" is referred to) between the wavelength on the short wavelength side and the wavelength on the long wavelength side at which the light transmittance of polarization transmission wavelength region Tp is 50% is larger than the wavelength range of the blue laser beam of the light source, and may range, for example, from 25 nm to 50 nm, inclusive. In the present exemplary embodiment, the width of the polarization transmission wavelength region of polarization separation element 30 is about 30 nm. As a result, polarization separation element 30 can improve the light utilization efficiency of the light source by the spectral characteristics illustrated in FIG. 3.

<Generation of Green and Red Color Component Light>

Returning to FIG. 1, propagation of light transmitted through polarization separation element 30 will be described. P-polarized blue component light Lp1 that is about 81% of blue polarized light Lsp is transmitted through polarization separation element 30, travels in the −X direction in the drawing along optical axis Oa, and enters condenser lens 31. P-polarized blue component light Lp1 is condensed by condenser lenses 31, 32, and when a diameter at which light intensity becomes 13.5% of peak intensity is defined as a spot diameter, P-polarized blue component light Lp1 is superimposed on blue spot light having a spot diameter of 1.5 mm to 2.5 mm, and is incident on the phosphor wheel 36. The first diffusion plate 29 can diffuse the light beam such that blue component light Lp1 enters the phosphor wheel 36 with a desired spot diameter.

Phosphor wheel 36 includes aluminum substrate 34 on which a reflective coating and phosphor layer 33 are formed, and motor 35 in a central portion, and is configured to be rotatable and controllable by rotation of motor 35. The reflective coating of phosphor wheel 36 is a metal coating or a dielectric coating that reflects visible light, and the reflective film of phosphor wheel 36 is formed on aluminum substrate 34. Further, phosphor layer 33 is formed on the reflective coating. In phosphor layer 33, a Ce-activated YAG-based yellow phosphor that is excited by a blue laser beam and emits yellow fluorescence containing green and red components is formed. A typical chemical composition of a crystalline matrix of this phosphor is $Y_3Al_5O_{12}$. Phosphor layer 33 can be formed in, for example, an annular shape.

Phosphor layer 33 excited by the spot light of P-polarized blue component light Lp1 can emit yellow fluorescence. The yellow fluorescence has a peak wavelength of 550 nm and a wide wavelength range of about 500 nm to 700 nm, and includes green and red color component light for combining the illumination light emitted from light source device 50. By rotating aluminum substrate 34, phosphor wheel 36 can suppress the temperature rise of phosphor layer 33 due to the excitation light, and can stably maintain the fluorescence conversion efficiency.

A part of the fluorescence generated by phosphor layer 33 advances in the +X direction and is emitted from phosphor wheel 36. The other part of the fluorescence travels in the −X direction, is reflected by a reflective coating in the +X direction, and is emitted from phosphor wheel 36. As described above, the fluorescence emitted from phosphor wheel 36 is non-polarized (natural) fluorescence light Lm3. Non-polarized fluorescence light Lm3 is condensed again by condenser lenses 31, 32, converted into substantially parallel light, then travels in the +X direction in the drawing along optical axis Oa, and reaches emission surface 30b of polarization separation element 30. Since the wavelength range of about 500 nm to 700 nm of non-polarized fluorescence light Lm3 is on the longer wavelength side than polarization transmission wavelength region Tp of polarization separation element 30, non-polarized fluorescence light Lm3 is reflected at emission surface 30b with high reflectance by the spectral characteristic (FIG. 3) of polarization separation element 30.

<Generation of Blue Color Component Light>

On the other hand, about 19% of S-polarized blue component light Ls2 reflected by polarization separation element 30 travels in the +Y direction in the drawing along optical axis Ob, enters condenser lens 41 that is the second light condensing element, and is condensed. In the present exemplary embodiment, a focal distance of condenser lens 41 is set such that a condensing angle is less than or equal to 40 degrees, and a condensed spot is formed near reflector 37.

The light beam condensed by condenser lens 41 enters second diffusion plate 39. Second diffusion plate 39 diffuses the incident light to make light intensity distribution uniform and eliminate speckle of the laser beam. For example, second diffusion plate 39 can be configured by forming a diffusion surface in fine irregularities on a glass surface of a thin plate. Second diffusion plate 39 has a sufficiently small diffusion angle, for example, such that the emitted light can have the polarization characteristics of the incident light. For example, the diffusion angle is approximately 4 degrees. The light emitted from second diffusion plate 39 is incident on phase conversion element 40 in the +Y direction.

Phase conversion element 40 includes reflector 37 and second retardation plate 38, and can convert the phase of the incident light and emit the converted light. For example, second retardation plate 38 can be constructed with a ¼ wavelength plate in which the phase difference of the ¼ wavelength is generated between the polarized components orthogonal to each other in the wavelength range of the blue laser beam of light source unit 20. Similarly to first retardation plate 28 described above, the ¼ wavelength plate as second retardation plate 38 may be configured using a thin coating retardation plate using birefringence by oblique vapor deposition, or may be configured using a microstructural retardation plate using birefringence by a microstructure.

In the present exemplary embodiment, for example, second retardation plate 38 can be disposed so as to have an angle of 45 degrees with respect to the X axis, with optical axis Ob on which S-polarized blue component light Ls2 is incident as a rotation axis. As a result, the incident light of S-polarized blue component light Ls2 can be converted into circularly polarized light and transmitted. The circularly polarized blue light transmitted through second retardation plate 38 is incident on reflector 37.

On reflector 37, a reflective coating such as aluminum or a dielectric multilayer coating is formed. Circularly polarized blue light incident on reflector 37 from second retardation plate 38 is reflected by reflector 37, so that the phase thereof is inverted. Therefore, the circularly polarized blue light is reflected as the counterclockwise circularly polarized blue light in the −Y direction in the drawing, is incident on second retardation plate 38 again, is converted from the circularly polarized light into P-polarized blue component light Lp4 by second retardation plate 38, and is emitted in the −Y direction in the drawing.

Next, P-polarized blue component light Lp4 emitted from second retardation plate 38 is again diffused by second diffusion plate 39, and the emitted light of second diffusion plate 39 is converted into a parallel light beam by condenser lens 41. The emitted light of condenser lens 41 travels in the −Y direction in the drawing along optical axis Ob, and reaches light receiving surface 30a of polarization separation element 30. Since the wavelength range of P-polarized blue component light Lp4 is within polarization transmission wavelength region Tp of polarization separation element 30 similarly to blue laser beam LB, P-polarized blue component light Lp4 can be transmitted through polarization separation element 30 with high transmittance due to the spectral characteristic (FIG. 3) of polarization separation element 30.

<Combining of Illumination Light>

Non-polarized fluorescence light Lm3 including the green and red color component lights and blue component light Lp4 are combined in polarization separation element 30 to generate white illumination light Li. Generated white illumination light Li is emitted from emission surface 30b of polarization separation element 30 in the −Y direction in the drawing along optical axis Ob. White illumination light Li combined in this manner has light emission characteristics with a good white balance, and even when white illumination light Li is separated into three primary color lights of blue light, green light, and red light in an optical system of a projection display apparatus to be described later, monochromatic light with high color purity can be obtained.

As described above, light source device 50 of the present disclosure can generate each color component light by separating and propagating the light from the light source using polarization separation element 30, and can combine each color component light in polarization separation element 30 to emit the illumination light. Further, due to the spectral characteristics of polarization separation element 30, the light utilization efficiency of the light source can be improved and brighter illumination light can be output as compared with the conventional technique.

Second Exemplary Embodiment

Light source device 50 according to the first exemplary embodiment of the present disclosure can be applied to, for example, a projection display apparatus. In the second preferred exemplary embodiment, a case will be described in which an active matrix-type transmissive liquid crystal panel that operates in a TN mode or a VA mode and has a thin film transistor formed in a pixel region is used as the light modulation element.

<Configuration of Projection Display Apparatus According to Second Exemplary Embodiment>

Figure 4:
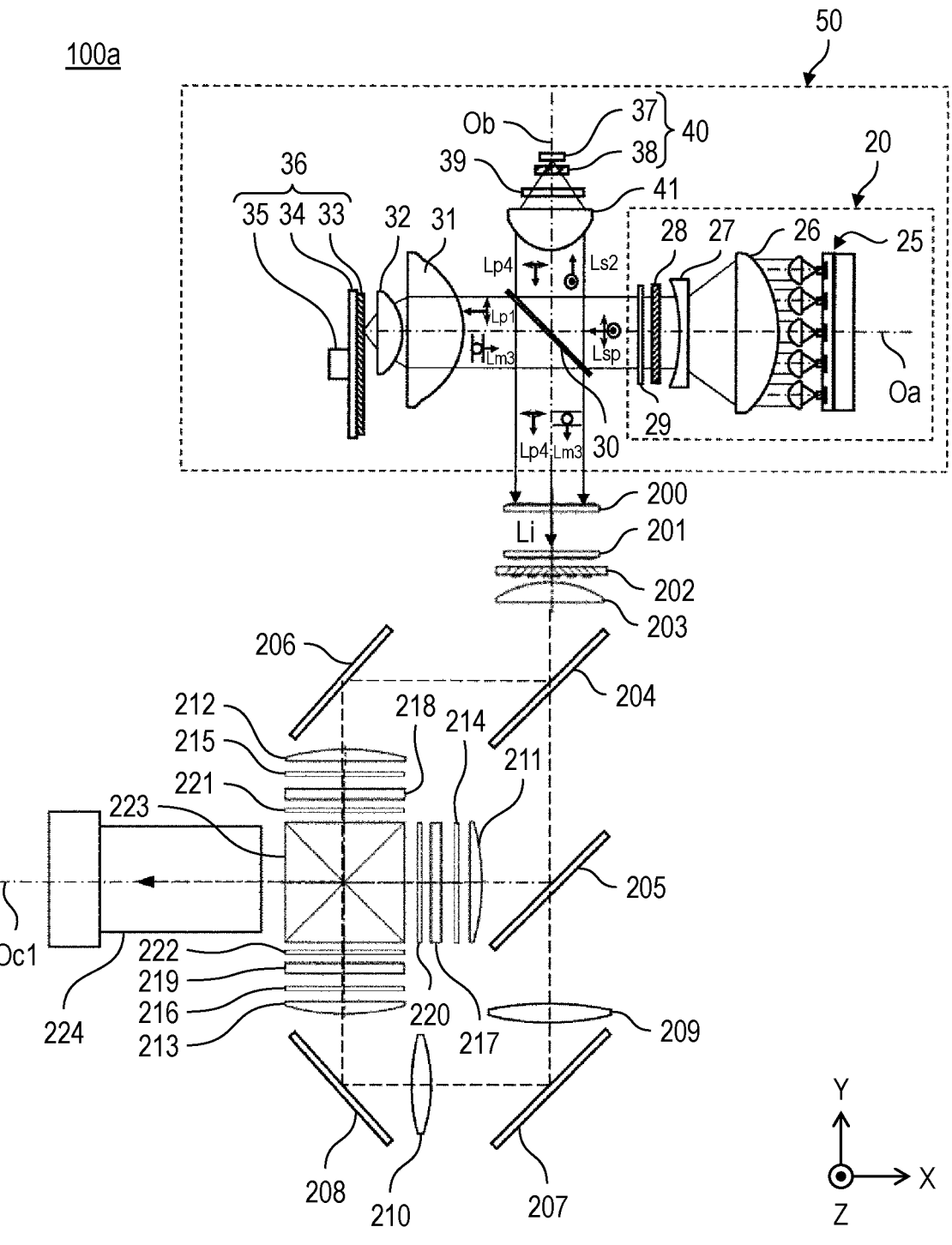
FIG. 4 is a schematic view illustrating a configuration of a projection display apparatus according to a second exemplary embodiment of the present disclosure.

FIG. 4 is a schematic view illustrating a configuration of projection display apparatus 100a according to the second exemplary embodiment of the present disclosure. projection display apparatus 100a of FIG. 4 includes light source device 50, first lens array plate 200, second lens array plate 201, polarization conversion element 202, superimposition lens 203, blue-reflecting dichroic mirror 204, green-reflecting dichroic mirror 205, reflection mirrors 206, 207, 208, relay lenses 209, 210, field lenses 211, 212, 213, incident side polarizing plates 214, 215, 216, liquid crystal panels 217, 218, 219, emission side polarizing plates 220, 221, 222, color-combining prism 223, and projection optical system 224.

Light source device 50 in FIG. 4 is light source device 50 according to the first exemplary embodiment as described above. In FIG. 4, the same elements are denoted by the same reference numerals, and the description thereof will be omitted.

In projection display apparatus 100a illustrated in FIG. 4, first and second lens array plates 200, 201, polarization conversion element 202, and superimposition lens 203 constitute an illumination optical system that guides white illumination light Li emitted from light source device 50 to the light modulation element.

As illustrated in FIG. 4, white illumination light Li from light source device 50 is emitted in the −Y direction in the drawing along optical axis Ob, and is incident on first lens array plate 200 including a plurality of lens elements. The light flux incident on first lens array plate 200 is split into a large number of light fluxes. The large number of divided light fluxes converge on second lens array plate 201 including a plurality of lens elements. The lens elements of first lens array plate 200 have aperture shapes similar to those of liquid crystal panels 217, 218, 219. The focal length of each lens element of second lens array plate 201 is determined to make first lens array plate 200 and liquid crystal panels 217,

218, 219 be in a substantially conjugated relationship. Light emitted from second lens array plate 201 is incident on polarization conversion element 202.

Polarization conversion element 202 includes a polarization separation prism and a ½ wavelength plate, and can convert non-polarized light into light in one polarization direction. In white illumination light Li, since fluorescence light Lm3 is non-polarized light, polarization conversion is performed in one polarization direction, but since blue component light Lp4 is incident as P-polarized light, the polarization direction is rotated by 90 degrees, and blue component light Lp4 is emitted as S-polarized light. The emitted light from polarization conversion element 202 is incident on superimposition lens 203.

Superimposition lens 203 is a lens for superimposing and illuminating the emission light of each lens element of second lens array plate 201 on liquid crystal panels 217, 218, 219.

The emitted light from superimposition lens 203 is split into blue light, green light, and red light by blue-reflecting dichroic mirror 204 and green-reflecting dichroic mirror 205 serving as color splitting units. The green light passes through field lens 211 and incident side polarizing plate 214 and then is incident on liquid crystal panel 217. After being reflected by reflection mirror 206, the blue light passes through field lens 212 and incident side polarizing plate 215 and then is incident on liquid crystal panel 218. The red light is transmitted through, refracted, and reflected by relay lenses 209, 210 and reflection mirrors 207, 208. The light further passes through field lens 213 and incident side polarizing plate 216, to be incident on liquid crystal panel 219.

On both sides of liquid crystal panels 217, 218, 219, incident side polarizing plates 214, 215, 216 and emission side polarizing plates 220, 221, 222 are arranged with their transmission axes being orthogonal to each other. Liquid crystal panels 217, 218, 219 change the polarization state of the incident light to spatially modulate the incident light, with voltage applied to their pixels controlled in accordance with an image signal, to form image light including the green light, the blue light, and the red light. The respective color lights transmitted through emission side polarizing plates 220, 221, 222 are incident on color-combining prism 223.

Color-combining prism 223 includes a red-reflecting dichroic mirror and a blue-reflecting dichroic mirror. Of the image light of each color transmitted through emission side polarizing plates 220, 221, 222, the green light is transmitted through color-combining prism 223, the red light is reflected by the red-reflecting dichroic mirror of color-combining prism 223, and the blue light is reflected by the blue-reflecting dichroic mirror of color-combining prism 223. As a result, the transmitted green light is combined with the reflected red light and blue light, and is incident on projection optical system 224.

The light incident on projection optical system 224 is propagated in the +X direction in the drawing along optical axis Oc1, and is enlarged and projected on a screen (not illustrated).

Since light source device 50 according to the present disclosure is compactly configured of the solid-state light sources, and emits the white illumination light with high efficiency and good white balance, a projection display apparatus having a long life and high brightness can be achieved. In the present exemplary embodiment, three liquid crystal panels 217, 218, 219 utilizing polarization, instead of time division schemes, are used as the light modulation elements. Thus, a bright and high-definition projection image with excellent color reproducibility and free of color breaking can be obtained. Further, no total reflection prism is required, and the color-combining prism is a small 45-degree incident prism. Thus, the projection display apparatus can be configured to have a size smaller than a display apparatus in a case where three DMD elements are used as the light modulation elements.

In the present exemplary embodiment, the transmission type liquid crystal panel is used as the image forming element. However, the present disclosure is not limited to the exemplary embodiment. For example, a projection display apparatus having a smaller size and a higher definition can be configured using a reflective liquid crystal panel.

Third Exemplary Embodiment

In a third exemplary embodiment of the present disclosure, a projection display apparatus configured using a digital micromirror device (DMD) as a light modulation element will be described.

Figure 5:
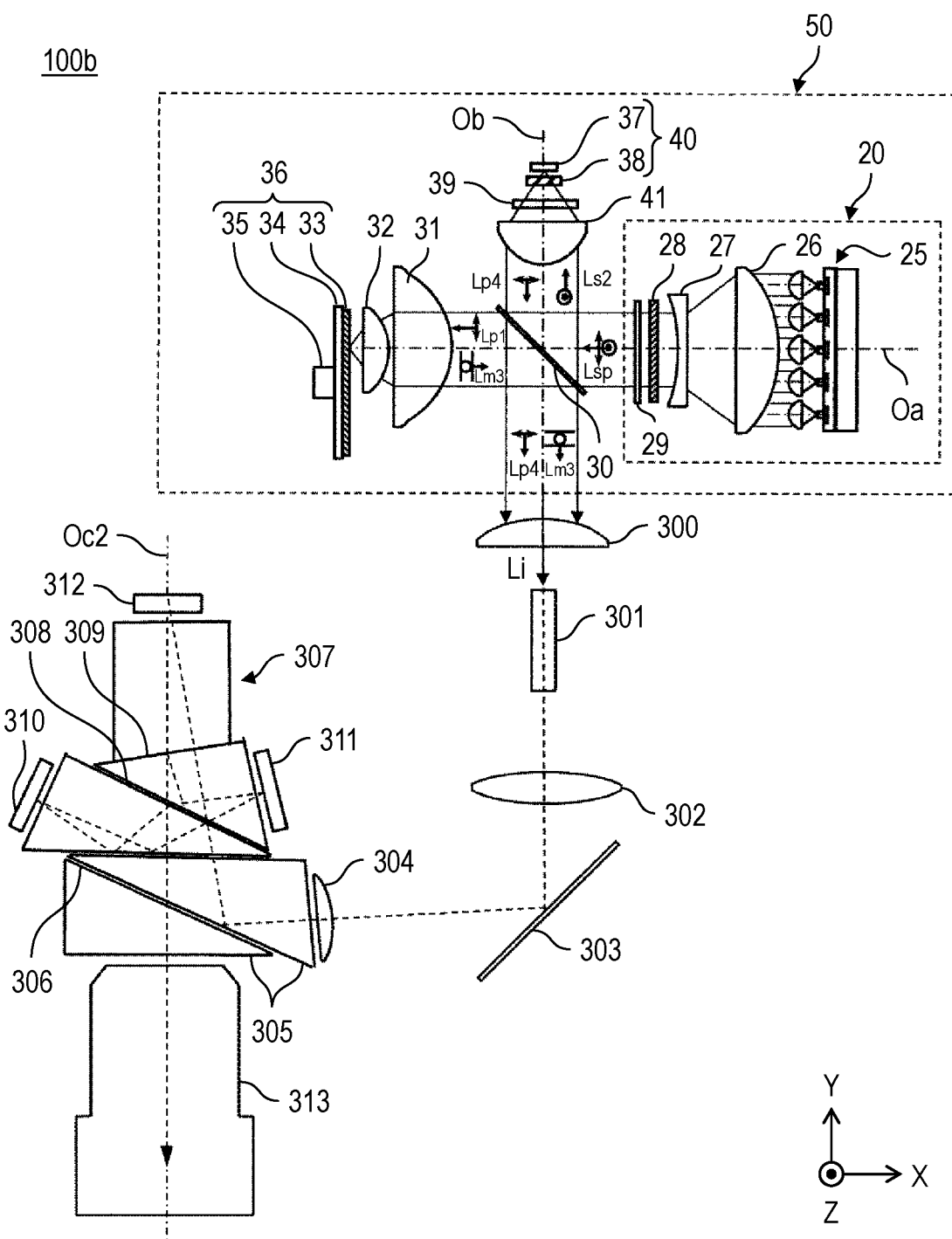
FIG. 5 is a schematic view illustrating a configuration of a projection display apparatus according to a third exemplary embodiment of the present disclosure.
Figure 6:
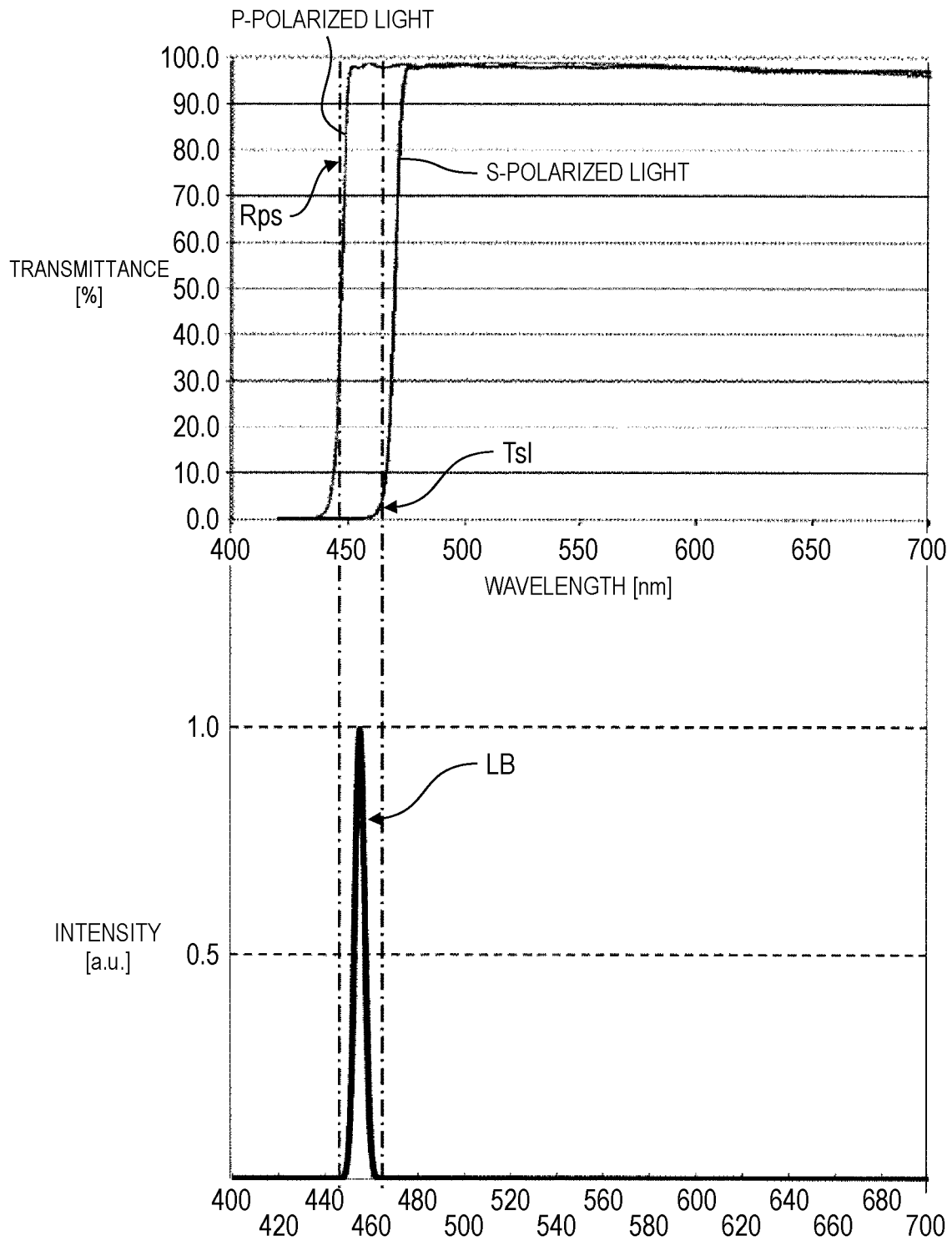
FIG. 6 is a graph illustrating a relationship between spectral characteristics of a dichroic mirror and an emission spectrum of a light source in PTL 1.

Configuration of Projection Display Apparatus According to Third Exemplary Embodiment FIG. 5 is a schematic view illustrating a configuration of projection display apparatus 100*b* according to a third exemplary embodiment of the present disclosure. projection display apparatus 100*b* in FIG. 5 includes light source device 50, condensing lens 300, rod integrator 301, relay lens 302, reflection mirror 303, field lens 304, total reflection prism 305, color prism 307, blue-reflecting dichroic mirror 308, red-reflecting dichroic mirror 309, DMDs 310, 311, 312, and projection optical system 313.

Light source device 50 in FIG. 5 is light source device 50 according to the first exemplary embodiment as described above. In FIG. 5, the same elements are denoted by the same reference numerals, and the description thereof will be omitted.

In the projection display apparatus 100*b* illustrated in FIG. 5, condensing lens 300, rod integrator 301, relay lens 302, reflection mirror 303, and field lens 304 constitute an illumination optical system that guides white illumination light Li emitted from the light source device 50 to a light modulation element (DMD).

As illustrated in FIG. 5, white illumination light Li from light source device 50 is emitted in the −Y direction in the drawing along optical axis Ob, is incident on condensing lens 300, and is condensed on rod integrator 301. The light incident on rod integrator 301 is emitted after the light intensity distribution is uniformized by being reflected inside rod integrator a plurality of times. The light emitted from rod integrator 301 is converged by relay lens 302, is reflected by reflection mirror 303, passes through field lens 304, and enters total reflection prism 305.

Total reflection prism 305 includes two prisms, and thin air layer 306 is formed between surfaces of the prisms close to each other. Air layer 306 totally reflects incident light at an angle equal to or more than a critical angle. The emitted light from field lens 304 is reflected by the total reflection surface of total reflection prism 305 to be incident on color prism 307.

Color prism 307 includes three prisms, and blue-reflecting dichroic mirror 308 and red-reflecting dichroic mirror 309 are formed on the proximal surfaces of the adjacent prisms. The incident light is split into blue light, red light, and green light by blue-reflecting dichroic mirror 308 and red-reflecting dichroic mirror 309 of color prism 307 to be respectively incident on DMDs 310, 311, 312.

DMDs 310, 311, 312 deflect the respective micromirrors according to the image signal, to separate the incident light into reflected light directed toward projection optical system 313 and reflected light traveling to the outside of the effective range of projection optical system 313. The light reflected by DMDs 310, 311, 312 passes through color prism 307 again.

In the process of passing through color prism 307, the blue light, the red light, and the green light that have been split are combined, and then the resultant light is incident on total reflection prism 305. Since the light incident on total reflection prism 305 is incident on air layer 306 at a sea angle or less, the light passes through total reflection prism 305, travels in the −Y direction in the drawing along optical axis Oc2, and is incident on projection optical system 313. The image light thus formed by DMDs 310, 311, 312 is projected onto a screen (not illustrated) in an enlarged manner.

Since light source device 50 according to the present disclosure is compactly configured of the solid-state light sources, and emits the white illumination light with high efficiency and good white balance, a projection display apparatus having a long life and high brightness can be achieved. In the present exemplary embodiment, with the DMDs 310, 311, 312 as the light modulation elements, the projection display apparatus featuring high light resistance and heat resistance can be obtained compared with a case of the light modulation elements using the liquid crystal panels. Further, since three DMDs are used, a bright and high-definition projection image with good color reproducibility can be obtained.

Note that, in the present exemplary embodiment, a case where three DMDs are used as the light modulation elements has been described, but the present disclosure is not limited thereto. For example, by using one DMD, a smaller projection display apparatus can be configured.

As described above, the exemplary embodiments have been described to exemplify the techniques in the present disclosure. The accompanying drawings and the detailed description have been presented for this purpose. Accordingly, in order to exemplify the techniques described above, components illustrated or described in the accompanying drawings and the detailed description may not only include components that are essential for solving the problems, but may also include components that are not essential for solving the problems. For this reason, it should not be immediately construed that those non-essential components are essential only based on the fact that those non-essential components are illustrated in the accompanying drawings or described in the detailed description.

Although the present disclosure has been fully described in connection with preferred exemplary embodiments with reference to the accompanying drawings, various modifications can be made within the scope of the claims. Such modifications and exemplary embodiments obtained by appropriately combining technical units disclosed in different exemplary embodiments are also included in the technical scope of the present disclosure.

The light source device according to the present disclosure is applicable to a projection display apparatus using an image forming unit.

What is claimed is:

1. A light source device comprising:

a light source unit that emits linearly polarized light in a first wavelength range, the linearly polarized light including first light that is light in a first polarization direction and second light that is light in a second polarization direction orthogonal to the first polarization direction;

a polarization separation element that receives the first light and the second light emitted from the light source unit;

a phosphor that receives the first light transmitted through the polarization separation element; and a phase conversion element that receives the second light reflected by the polarization separation element, wherein the polarization separation element has a polarization transmission wavelength region including the first wavelength range, transmits the light in the first polarization direction and reflects the light in the second polarization direction in the polarization transmission wavelength region, and reflects light regardless of a polarization direction in a visible light range on a longer wavelength side than the polarization transmission wavelength region, the phosphor converts the received first light into third light in a wavelength range on a longer wavelength side than the polarization transmission wavelength region and emits the third light to the polarization separation element, the phase conversion element phase-converts the received second light into fourth light that is the light in the first polarization direction in the first wavelength range and emits the fourth light to the polarization separation element, the polarization separation element generates illumination light by combining the third light reflected by the polarization separation element and the fourth light transmitted through the polarization separation element, the phase conversion element includes a second retardation plate and a reflector disposed along a light propagation path of the second light reflected by the polarization separation element, the second retardation plate is a ¼ wavelength plate, receives the second light, converts linearly polarized light into circularly polarized light, and transmits the circularly polarized light, and the reflector receives light transmitted through the second retardation plate, inverts a phase of the light, and reflects the light to the second retardation plate.

2. The light source device according to claim 1, wherein the light source unit further includes a first retardation plate, and the first retardation plate controls a ratio between the first light and the second light emitted from the light source unit.

3. The light source device according to claim 2, wherein the first retardation plate is a ½ wavelength plate or a ¼ wavelength plate.

4. The light source device according to claim 2, wherein the first retardation plate is a thin coating retardation plate using birefringence by oblique vapor deposition or a micro-structural retardation plate using birefringence by a microstructure.

5. The light source device according to claim 1, wherein the polarization separation element has, in the polarization transmission wavelength region, a transmittance of 96% or more with respect to the first light, and a reflectance of 98% or more with respect to the second light.

6. The light source device according to claim 1, wherein a width of the polarization transmission wavelength region ranges from 25 nm to 50 nm, inclusive.

7. The light source device according to claim 1, wherein the polarization separation element is a flat plate-shaped polarization beam splitter.

8. The light source device according to claim 1, wherein the first light and the second light are blue laser beams.

9. The light source device according to claim 1, wherein the first light is P-polarized light.

10. A projection display apparatus comprising:

the light source device according to claim 1;

a light modulation element that spatially modulates incident light according to an image signal;

an illumination optical system that guides illumination light emitted from the light source device to the light modulation element; and a projection optical system that enlarges and projects light emitted from the light modulation element to display an image.

11. The projection display apparatus according to claim 10, wherein the light modulation element is a liquid crystal panel.

12. The projection display apparatus according to claim 10, wherein the light modulation element is a digital micro-mirror device.

13. A light source device comprising:

a light source unit that emits linearly polarized light in a first wavelength range, the linearly polarized light including first light that is light in a first polarization direction and second light that is light in a second polarization direction orthogonal to the first polarization direction;

a polarization separation element that receives the first light and the second light emitted from the light source unit;

a phosphor that receives the first light transmitted through the polarization separation element; and a phase conversion element that receives the second light reflected by the polarization separation element, wherein the polarization separation element has a polarization transmission wavelength region including the first wavelength range, transmits the light in the first polarization direction and reflects the light in the second polarization direction in the polarization transmission wavelength region, and reflects light regardless of a polarization direction in a visible light range on a longer wavelength side than the polarization transmission wavelength region, the phosphor converts the received first light into third light in a wavelength range on a longer wavelength side than the polarization transmission wavelength region and emits the third light to the polarization separation element, the phase conversion element phase-converts the received second light into fourth light that is the light in the first polarization direction in the first wavelength range and emits the fourth light to the polarization separation element, the polarization separation element generates illumination light by combining the third light reflected by the polarization separation element and the fourth light transmitted through the polarization separation element, the phase conversion element includes a second retardation plate and a reflector disposed along a light propagation path of the second light reflected by the polarization separation element, and the second retardation plate is a ¼ wavelength plate.

14. The light source device according to claim 13, wherein the second retardation plate is a thin coating retardation plate using birefringence by oblique vapor deposition or a microstructural retardation plate using birefringence by a microstructure.

15. A light source device comprising:

a light source unit that emits linearly polarized light in a first wavelength range, the linearly polarized light including first light that is light in a first polarization direction and second light that is light in a second polarization direction orthogonal to the first polarization direction;

a polarization separation element that receives the first light and the second light emitted from the light source unit;

a phosphor that receives the first light transmitted through the polarization separation element; and a phase conversion element that receives the second light reflected by the polarization separation element, wherein the polarization separation element has a polarization transmission wavelength region including the first wavelength range, transmits the light in the first polarization direction and reflects the light in the second polarization direction in the polarization transmission wavelength region, and reflects light regardless of a polarization direction in a visible light range on a longer wavelength side than the polarization transmission wavelength region, the phosphor converts the received first light into third light in a wavelength range on a longer wavelength side than the polarization transmission wavelength region and emits the third light to the polarization separation element, the phase conversion element phase-converts the received second light into fourth light that is the light in the first polarization direction in the first wavelength range and emits the fourth light to the polarization separation element, the polarization separation element generates illumination light by combining the third light reflected by the polarization separation element and the fourth light transmitted through the polarization separation element, and wherein the polarization separation element reflects light regardless of a polarization direction in a visible light range other than the polarization transmission wavelength region.

\* \* \* \* \*